United States Patent
Hahm

(10) Patent No.: US 10,193,644 B2
(45) Date of Patent: Jan. 29, 2019

(54) METHOD AND DEVICE FOR TRANSMITTING DATA IN ELECTRONIC DEVICE

(71) Applicant: SAMSUNG ELECTRONICS CO., LTD., Suwon-si (KR)

(72) Inventor: Seong-Il Hahm, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 85 days.

(21) Appl. No.: 15/000,238

(22) Filed: Jan. 19, 2016

(65) Prior Publication Data

US 2016/0212057 A1    Jul. 21, 2016

(30) Foreign Application Priority Data

Jan. 20, 2015 (KR) ........................ 10-2015-0009503

(51) Int. Cl.
| | |
|---|---|
| G06F 13/00 | (2006.01) |
| G06F 12/00 | (2006.01) |
| H04B 17/364 | (2015.01) |
| H04W 4/70 | (2018.01) |

(52) U.S. Cl.
CPC ............ H04B 17/364 (2015.01); H04W 4/70 (2018.02)

(58) Field of Classification Search
CPC .......................... H04W 4/005; H04W 36/0055
USPC .................................................. 370/331, 329
See application file for complete search history.

(56) References Cited

U.S. PATENT DOCUMENTS

| | | | |
|---|---|---|---|
| 6,539,026 B1 * | 3/2003 | Waclawsky | ............. H04L 47/10 370/252 |
| 2004/0165532 A1 | 8/2004 | Poor et al. | |
| 2004/0165543 A1 | 8/2004 | Nakazawa | |
| 2006/0146831 A1 * | 7/2006 | Argyropoulos | ......... H04L 49/90 370/394 |

(Continued)

FOREIGN PATENT DOCUMENTS

| | | |
|---|---|---|
| EP | 1450521 A2 | 8/2004 |
| KR | 10-2005-0086184 | 8/2005 |

(Continued)

OTHER PUBLICATIONS

EP Search Report for EP Application No. 16740354.2 dated Nov. 16, 2017.

(Continued)

*Primary Examiner* — Asad M Nawaz
*Assistant Examiner* — Jason A Harley
(74) *Attorney, Agent, or Firm* — Nixon & Vanderhye P.C.

(57) ABSTRACT

The disclosure relates to a method of transmitting data in various types of electronic devices that are connected to the Internet of Things (IoT). An electronic device, according to an example of the disclosure, may include an additional storage device in addition to a buffer that stores data packets for created or collected information in order to minimize or reduce the loss of the information. Further, according to an example of the disclosure, the electronic device can re-transmit data by determining a re-transmission delay value or an aggregation level using a maximum transmission delay value required by an application associated with the corresponding data packet and a current transmission delay value counted based on the creation time of the data packet.

16 Claims, 9 Drawing Sheets

(56) References Cited

U.S. PATENT DOCUMENTS

| | | | |
|---|---|---|---|
| 2008/0240108 A1* | 10/2008 | Hyldgaard | G10L 19/005 370/394 |
| 2010/0046378 A1* | 2/2010 | Knapp | H04L 41/0604 370/242 |
| 2011/0128853 A1* | 6/2011 | Nishimura | H04L 47/10 370/235 |
| 2011/0239043 A1* | 9/2011 | Vedder | G06F 1/263 714/14 |
| 2011/0286413 A1* | 11/2011 | Nishio | H04J 11/0073 370/329 |
| 2013/0094356 A1 | 4/2013 | Keith et al. | |
| 2015/0009960 A1 | 1/2015 | Surface et al. | |
| 2015/0163048 A1* | 6/2015 | Turnbull | H04J 3/16 370/508 |

FOREIGN PATENT DOCUMENTS

| | | |
|---|---|---|
| KR | 10-2011-0092966 | 8/2011 |
| KR | 10-2013-0138598 | 12/2013 |
| KR | 10-2014-0037173 | 3/2014 |
| KR | 10-2014-0128850 | 11/2014 |

OTHER PUBLICATIONS

Search Report and Written Opinion dated May 20, 2016 in counterpart International Patent Application No. PCT/KR2016/000454.

* cited by examiner

METHOD AND DEVICE FOR TRANSMITTING DATA IN ELECTRONIC DEVICE

CROSS-REFERENCE TO RELATED APPLICATION

This application is based on and claims the priority under 35 U.S.C. § 119 to Korean Application Serial No. 10-2015-0009503, which was filed in the Korean Intellectual Property Office on Jan. 20, 2015, the content of which is incorporated by reference herein in its entirety.

FIELD

The disclosure relates to an electronic device and, for example, to a method and device for transmitting data in an electronic device.

BACKGROUND

These days, machine type communication is rapidly evolving from a Machine to Machine (M2M) concept capable of performing intelligent communication between people and things, or between things, using a mobile communication network into a concept of interacting with all information of real and virtual worlds as well as things while extending its area to the Internet. Namely, M2M that enables the intelligent communication between people and things, or between things, anytime and anywhere in real time in a stable and convenient manner is extending its area to the Internet of Things (IoT) while connecting all surrounding things through the Internet.

The Internet of Things (IoT) refers to a technology of connecting various types of things, which have a sensor and a communication function embedded therein, to the Internet. Here, the things include various embedded systems (a computer system of an electronic device such as a smart phone), such as home appliances, mobile equipment, wearable computers, etc. The things connected to the IoT have to be connected to the Internet with unique IPs by which the things can be identified, and may have sensors embedded therein for acquiring information from an external environment.

An example of a network to which such an IoT is applied is illustrated in FIG. 1. FIG. 1 is a diagram illustrating an example IoT network. Referring to FIG. 1, the IoT network 100 may include a smart LED 10, a thermometer 20, a washing machine 30, a smart refrigerator 40, a robotic vacuum cleaner 50, a smart TV 60, a digital camera 70, a smart phone 80, a wearable device 70, and the like.

The devices that constitute the IoT network 100 may be classified into: small things that have comparatively simple unique functions and accordingly have small hardware for providing IoT services, such as the smart LED 10 and the thermometer 20; big things that have no display, such as the washing machine 30, the smart refrigerator 40, and the robotic vacuum cleaner 50; and big things that have displays, such as the smart TV 60, the digital camera 70, the smart phone 80, and the wearable device 90.

The devices may transmit and receive data packets that include sensor data measured through sensors included therein or information collected thereby. Accordingly, information may be collected by a specific device, for example, the smart phone 80 and may be provided to users. Alternatively, the information may be provided to an external service server, which makes it possible to provide services using the information. For example, a room temperature measured by the thermometer 20 may be transmitted to the smart phone 80, and a user may identify the temperature to control the room temperature.

Accordingly, each device that constitutes the IoT network 100 may operate as one node, and the devices, such as the smart TV 60, the digital camera 70, the smart phone 80, and the wearable device 90, may be specified as sink nodes that collect information of the other node devices.

SUMMARY

Each node device may periodically transmit a data packet that includes information created thereby so that the sink nodes can collect the information. Accordingly, each node device may also forward a data packet, which is received from one adjacent node, to another adjacent node. In this process, loss or a transmission delay of the data packet may be generated due to factors of a wireless environment.

Further, each of the devices requires a storage space for storing a data packet created thereby or a data packet received from an adjacent node. However, the devices that correspond to small things generally have small storage spaces for data packets so that the data packets may be lost.

In addition, unnecessary power may be consumed due to the loss or transmission delay of the data packets.

In order to solve the problems, the disclosure provides a data transmission method and device that can maximize and/or improve quality of transmission.

Furthermore, the disclosure provides a data transmission method and device that can minimize and/or reduce current consumption of a device.

Moreover, the disclosure provides a data transmission method and device that can control a transmission delay in order to ensure a transmission time required by an application of a device.

In addition, the disclosure provides a method and device that can also stably transmit data in a wireless environment that may be rapidly changed due to multi-path finding, wireless signal interference, or the like.

Also, the disclosure provides a method and device that can stably transmit data even when a device lacks a storage space.

A method of transmitting data in an electronic device may include: transmitting a data packet selected from a buffer based on a transmission sequence; determining a re-transmission delay value using a maximum transmission delay value corresponding to the selected data packet, the current transmission delay value of the selected data packet, and the currently measured received-signal strength when the transmission of the selected data packet fails; and transmitting the selected data packet again after delaying the data transmission by the re-transmission delay value.

A method of transmitting data in an electronic device may include: creating a data packet that includes information created by the electronic device; storing the created data packet in a database when there is little or no available storage space in a buffer; determining a representative data packet by selecting data packets corresponding to an aggregation level, from the database, and storing the representative data packet in the buffer when there is sufficient storage space in the buffer; and sequentially transmitting data packets stored in the buffer.

An electronic device may include: transmission/reception circuitry configured to transmit and receive data; a buffer in which data packets are stored; and a processor configured to transmit a data packet selected from the buffer through the transmission/reception circuitry based on a transmission sequence; said processor configured to determine a re-transmission delay value using a maximum transmission delay value corresponding to the selected data packet, the current transmission delay value of the selected data packet, and the currently measured received-signal strength when the transmission of the selected data packet fails; and the processor further configured to transmit the selected data packet again through the transmission/reception circuitry after delaying the data transmission by the re-transmission delay value.

An electronic device may include: transmission/reception circuitry configured to transmit and receive data; a buffer in which data packets are stored; a database that: stores data packets when there is no sufficient storage space in the buffer; and determines a representative data packet by selecting data packets corresponding to an aggregation level, from the database, and stores the representative data packet in the buffer when a storage space of the buffer is sufficient; and a processor configured to determine the aggregation level and to sequentially transmit the data packets stored in the buffer through the transmission/reception circuitry.

The disclosure can maximize and/or improve quality of data transmission of a device that may be included in an IoT network, and can minimize and/or reduce current consumption of the device during data transmission. Further, the disclosure can control a transmission delay in order to ensure a transmission time required by an application of a device during data transmission. The disclosure can stably transmit data in a wireless environment that may be rapidly changed due to multi-path finding, wireless signal interference, or the like. In addition, the disclosure can stably transmit data even when a device lacks sufficient storage space.

BRIEF DESCRIPTION OF THE DRAWINGS

The above and other aspects, features, and advantages of the disclosure will be more apparent from the following detailed description, taken in conjunction with the accompanying drawings, in which like reference numerals refer to like elements, and wherein.

DETAILED DESCRIPTION

Figure 1:
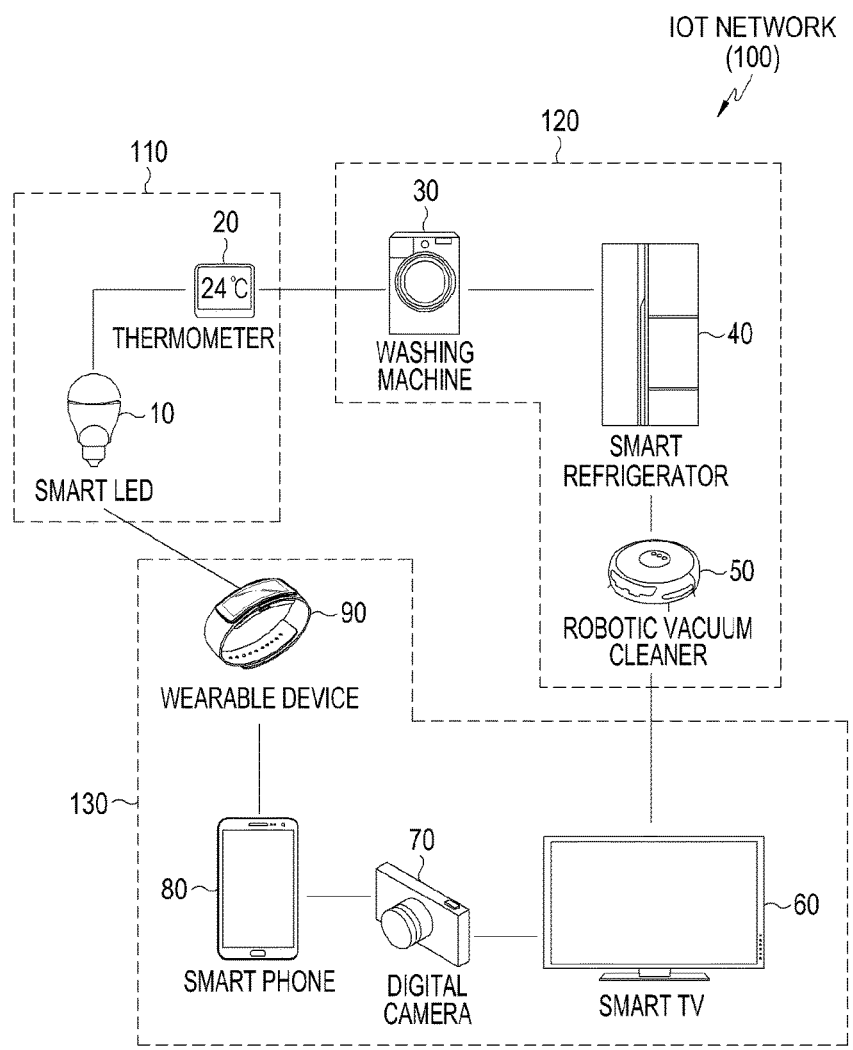
FIG. 1 is a diagram illustrating an example of a typical IoT network.

Various example embodiments of the disclosure will be described in connection with the accompanying drawings. The disclosure may be modified in various forms and include various embodiments, but examples are illustrated in the drawings and described in the description. However, the description is not intended to limit the disclosure to the example embodiments, and it shall be appreciated that all the changes, equivalents and substitutions belonging to the idea and technical scope of the disclosure are included in the disclosure. In the description of the drawings, identical or similar reference numerals are used to designate identical or similar elements.

The term "include" or "may include" refers to the existence of a corresponding disclosed function, operation or component which can be used in various example embodiments of the disclosure and does not limit one or more additional functions, operations, or components. In the disclosure, the terms such as "include" or "have" may be construed to denote a certain characteristic, number, step, operation, constituent element, component or a combination thereof, should not be construed to exclude the existence of or a possibility of addition of one or more other characteristics, numbers, steps, operations, constituent elements, components or combinations thereof.

The term "or" as used in various example embodiments of the disclosure includes any or all of combinations of listed words. For example, the expression "A or B" may include A, may include B, or may include both A and B.

The expression "1", "2", "first", or "second" used in various example embodiments of the disclosure may modify various components of various example embodiments but does not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. When one component element is "directly coupled" or "directly connected" to another component element, it may be construed that a third component element does not exist between the first component element and the second component element.

The terms in various example embodiments of the disclosure are used to describe an example embodiment, and are not intended to limit the disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

An electronic device according to various example embodiments of the disclosure may include a device which can transmit data. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch), or the like.

According to some example embodiments, the electronic device may be a smart home appliance which can transmit data. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames, or the like.

According to some example embodiments, the electronic device may include at least one of various medical devices which can transmit data {e.g., a magnetic resonance angiography (MRA), a magnetic resonance imaging (MRI), a computed tomography (CT) machine, and an ultrasonic machine}, navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops, or the like.

According to some example embodiments, the electronic device may include at least one of a part of furniture or a building/structure which can transmit data, an electronic board, an electronic signature receiving device, a projector, and various kinds of measuring instruments (e.g., a water meter, an electric meter, a gas meter, a radio wave meter, and the like), or the like. An electronic device according to various example embodiments of the disclosure may be a combination of one or more of above described various devices. An electronic device according to various example embodiments of the disclosure may be a flexible device. An electronic device according to various example embodiments of the disclosure is not limited to the above described devices.

The disclosure relates to a method of transmitting data in various types of electronic devices that are connected to the Internet of Things (IoT). The various types of electronic devices, which are connected to the Internet of Things (IoT), can periodically transmit data packets, which include created or collected information, to another electronic device that is connected to the Internet of Things (IoT).

According to an example embodiment of the disclosure, an electronic device may include an additional storage device in addition to a buffer that stores data packets for created or collected information, to thereby minimize and/or reduce loss of the information.

According to an example embodiment of the disclosure, the electronic device, when re-transmitting a data packet, may, for example, determine a transmission delay value of the corresponding data packet based on the maximum transmission delay value required by an application associated with the corresponding data packet, the current transmission delay value based on the creation time of the data packet, and the currently received signal strength, and may transmit the data packet after delaying the transmission based on the determined transmission delay value. Accordingly, the electronic device may transmit the data packet such that the application does not exceed the specified maximum transmission delay time, and the data packet can be transmitted in cases where a wireless environment is good.

Further, according to an example embodiment of the disclosure, the electronic device may determine an aggregation level based on a result obtained by comparing the maximum transmission delay value and the current transmission delay value of a data packet. The aggregation level may represent a number of data packets that will be processed when data is transmitted once. In cases where a plurality of data packets correspond to the aggregation level, one representative data packet can be created and transmitted using the plurality of data packets, thereby preventing a transmission delay of the data packets in which an application exceeds the specified maximum transmission delay time, and reducing power consumption during the transmission.

The configuration of the electronic device, according to an example embodiment of the disclosure, will be described below with reference to FIGS. 2 and 3.

Figure 2:
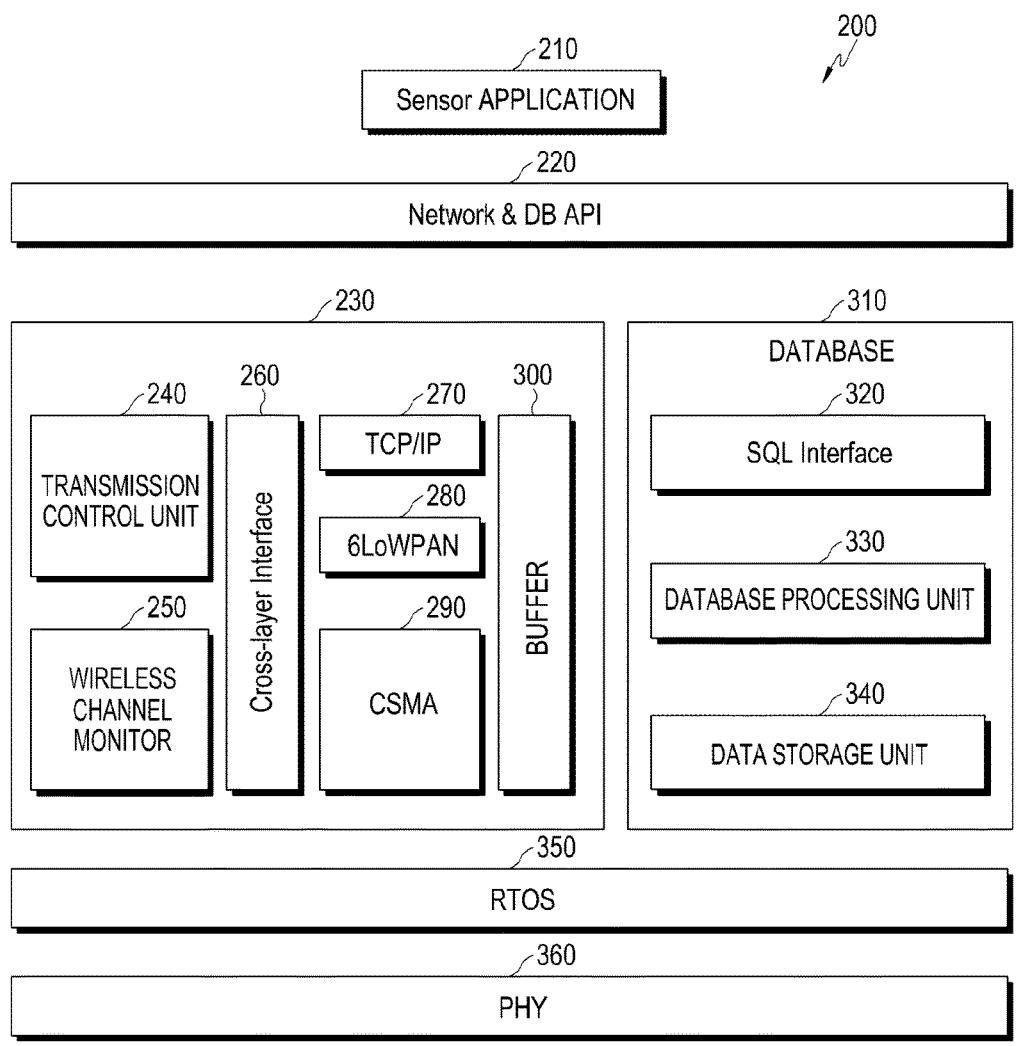
FIG. 2 is a diagram illustrating an example hierarchical structure of an electronic device.

FIG. 2 is a diagram illustrating an example hierarchical structure of an example electronic device.

Referring to FIG. 2, the electronic device 200 may include a sensor application 210, a network and database (DB) application interface 220, a network stack 230, a database 310, a real-time operating system (RTOS) 350, and a physical layer (PHY) 360. Further, the network stack 230 may include a transmission control unit (e.g., including processing circuitry) 240, a wireless channel monitor (e.g., including monitoring circuitry) 250, a cross layer interface 260, a Transfer Control Protocol/Internet Protocol (TCP/IP) 270, a IPv6 Low Power Wireless Personal Area Network (6LoW-PAN) 280, a Carrier Sense Multiple Access (CSMA) 290, and a buffer 300. The database 310 may include a Structured Query Language (SQL) interface 320, a database processing unit 330, and a data storage unit 340.

The sensor application 210 may, for example, collect sensor data from a sensor included in the electronic device 200 periodically or at a specific time point and may create a data packet using the collected sensor data based on a function or service that the sensor application provides. The sensor application 210 may set a maximum transmission delay value that corresponds to the created data packet. The maximum transmission delay value may, for example, be a maximum time interval during which a transmission delay is possible based on the time point when the data packet is created, and may, for example, be determined based on the importance of the data packet and a function or service in which the data packet is used. The sensor application 210 may transfer the created data packet to the TCP/IP 270 of the network stack 230 through the network and database application interface 220.

The network and database application interface 220 may provide an interface between the sensor application 210, the network stack 230, and the database 310.

The TCP/IP 270 may, for example, store the data packet transferred from the sensor application 210 if there is a space to store a data packet in the buffer 300. If the buffer 300 has sufficient space to store the data packet, the TCP/IP 270 may store the data packet transferred from the sensor application 210. If a predetermined number of data packets are already stored in the buffer 300, the TCP/IP 270 may store the data packet, which is transferred from the sensor application 210, in the database 310. According to another example embodiment, the TCP/IP 270 may transfer the data packet, which is received from the sensor application 210, to the buffer 300, and the buffer 300 may store the data packet transferred from the TCP/IP 270 if there is sufficient available storage space therein and may store the corresponding data packet in the database 310 if not.

The buffer 300 may store the data packet received from the TCP/IP 270. According to another example embodiment, the buffer 300, when receiving the data packet from the TCP/IP 270, may store the received data packet if there is sufficient available storage space therein and may store the corresponding data packet in the database 310 if not. The buffer 300 may select a data packet based on a transmission sequence from the data packets stored therein in response to a request of the CSMS 290 and may transfer the selected data packet to the CSMA 290, thereby allowing the selected data packet to be transmitted. If sufficient available storage space is ensured as the selected data packet is completely transmitted, the buffer 300 may retrieve the data packet stored in the database 310 and may store the same therein under the control of the transmission control unit 240. For example, if sufficient available storage space is ensured as any one data packet stored in the buffer 300 is completely transmitted, the buffer 300 may transfer, to the database 310, an aggregation level that has been set by the transmission control unit 240, and the database 310 may store a data packet corresponding to the aggregation level in the buffer 300.

The cross layer interface 260 may provide an interface between the transmission control unit 240 and one of the wireless channel monitor 250, the TCP/IP 270, the Carrier Sense Multiple Access (CSMA) 290, and the buffer 300.

The wireless channel monitor 250 may periodically monitor a received signal strength of a wireless channel, through which the electronic device 200 performs wireless communication with another electronic device therearound that is connected to IoT, through the physical layer 360, and may transmit the received signal strength to the transmission control unit 240 through the cross layer interface 260. According to another example embodiment, the wireless channel monitor 250 may monitor the received signal strength of the wireless channel when the transmission control unit 240 makes a request, and may transmit the received signal strength to the transmission control unit 240 through the cross layer interface 260.

The CSMA 290 may transmit the data packet stored in the buffer 300 through the physical layer 360 under the control of the transmission control unit 240. For example, the CSMA 290 may attempt to first transmit the data packet, which has been transferred from the buffer 300, to a surrounding device based on an instruction of the transmission control unit 240, and may attempt to transmit the next data packet when a transmission success response is received from the surrounding device. If a transmission failure response is received from the surrounding device, the CSMA 290 may delay the transmission based on a re-transmission delay value that has been set by the transmission control unit 240, and may attempt to transmit the corresponding data packet again. The CSMA 290 may operate based on the re-transmission delay value, which has been set by the transmission control unit 240, every time re-transmission is attempted, and may drop the corresponding data packet if the transmission fails for a maximum number of re-transmissions. The maximum number of re-transmissions may be determined by the sensor application 210 or the transmission control unit 240, and may be determined based on a function or service in which the data packet is used.

The database 310 may store the data packet transferred from the buffer 300 according to the example embodiment. The SQL interface 320 of the database 310 may provide an interface between the network stack 230 and the database 310. The data storage unit 340 of the database 310 may store the data packet. The database processing unit 330 may be configured to determine a data packet to transfer to the buffer 300 based on the aggregation level transferred by the buffer 300 and the transmission sequence of data packets stored in the data storage unit 340. The aggregation level may represent the number of data packets that will be processed every time data is transmitted once. In cases where one data packet corresponds to the aggregation level, the data processing unit 330 may be configured to select the first data packet stored in the data storage unit 340 and may store the selected data packet in the buffer 300. In cases where a plurality of data packets correspond to the aggregation level, the data processing unit 330 may be configured to sequentially select the plurality of data packets and may be configured to determine representative information using information corresponding to each of the selected data packets. For example, the data processing unit 330 may determine the average of the plurality of pieces of information to be the representative information. For example, the data processing unit 330 may determine the average of the plurality of pieces of information to be representative information. For example, among the plurality of pieces of information, the largest value, the smallest value, or a randomly selected value may be determined to be representative information. The data processing unit 330 may configure a representative data packet that includes the representative information and may store the representative data packet in the buffer 300.

The transmission control unit 240 may be configured to control the transmission of the data packet that is stored in the buffer 300 or in the database 310. According to an example embodiment, the transmission control unit 240 may transfer a data packet transmission request to the CSMA 290 through the cross layer interface 260. The CSMA 290 may derive one of the data packets, which are stored in the buffer 300, based on the transmission sequence and may attempt the first transmission of the derived data packet to a surrounding device. If a transmission failure response is received from the surrounding device in response to the first transmission, the transmission control unit 240 may determine a re-transmission delay value of the corresponding data packet based on the maximum transmission delay value required by an application associated with the corresponding data packet, the current transmission delay value that has been counted up to the present based on the creation time of the data packet, and the currently received signal strength of the wireless channel. The current transmission delay value may be determined, for example, by one of the sensor application 210, the TCP/IP 270, and the transmission control unit 240. The received signal strength may be received from the wireless channel monitor 250.

The transmission control unit 240 may be configured to determine an additional transmission delay value using the current transmission delay value and the maximum transmission delay value when the current transmission delay value is smaller than or equal to the maximum transmission delay value. For example, the additional transmission delay value may be obtained by subtracting the current transmission delay value from the maximum transmission delay value. Further, when the currently received signal strength is lower than the minimum received signal strength, the transmission control unit 240 may determine the sum of a default transmission delay value and the additional transmission delay value to be a re-transmission delay value, and when the currently received signal strength exceeds the minimum received signal strength, the transmission control unit 240 may determine the default transmission delay value to be a re-transmission delay value.

The transmission control unit 240 may be configured to set the re-transmission delay value to the CSMA 290. The CSMA 290 may delay the transmission of the data packet based on the set re-transmission delay value and then, may attempt to re-transmit the corresponding data packet. The transmission control unit 240 may determine a re-transmission delay value every time re-transmission is attempted, and may set the determined re-transmission delay value to the CSMA 290. The CSMA 290 may drop the corresponding data packet if the transmission fails for the maximum number of re-transmissions.

According to another example embodiment, in cases where an available storage space in the buffer 300 is sufficient and data packets exist in the database 310 as at least one data packet stored in the buffer 300 is completely transmitted, the transmission control unit 240 may determine an aggregation level based on the result obtained by comparing the current transmission delay value of the oldest data packet stored in the database 310 with the maximum transmission delay value. Further, the transmission control unit 240 may set the aggregation level to the buffer 300.

For example, when the current transmission delay value of the oldest data packet stored in the database 310 exceeds half of the maximum transmission delay value, the transmission control unit 240 may increase an increment by 1, and when the increased increment exceeds a reference value, the transmission control unit 240 may increase the existing aggregation level by 1 level. If the current transmission delay value of the data packet is smaller than or equal to half of the maximum transmission delay value, the transmission control unit 240 may increase a decrement by 1, and when the increased decrement exceeds the reference value, the transmission control unit 240 may decrease the aggregation level by 1 level.

The buffer 300 may transfer the aggregation level, which has been set by the transmission control unit 240, to the database 310, and the database 310 may determine a data packet to transfer to the buffer 300 based on the transferred aggregation level and the transmission sequence of data packets stored in the data storage unit 340.

Figure 3:
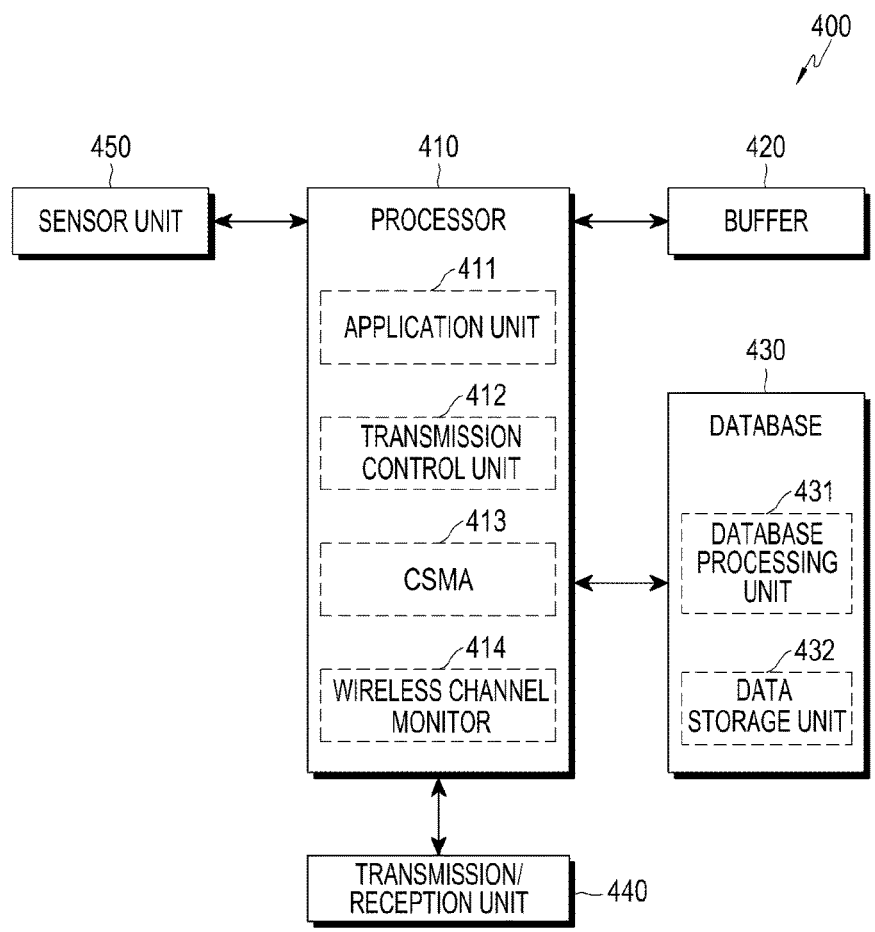
FIG. 3 is a diagram illustrating an example configuration of an example electronic device.

An example of the configuration of an electronic device 400, to which the hierarchical structure of the electronic device 200 illustrated in FIG. 2 is applied, is illustrated in FIG. 3. FIG. 3 is a diagram illustrating an example configuration of the electronic device.

Referring to FIG. 3, the electronic device 400 may include a processor 410, a buffer 420, a database 430, a transmission/reception unit (e.g., including communication circuitry) 440, and a sensor unit 450. The processor 410 may include an application unit 411, a transmission control unit 412, a CSMA 413, and a wireless channel monitor 414. The database 430 may include a data processing unit 431 and a data storage unit 432.

The sensor unit 450 includes a sensor for acquiring information from an external environment. For example, the sensor unit 450 may include one or more of a temperature sensor, an optical sensor, a geo-magnetic sensor, a GPS sensor, and a bio-signal detection sensor, or the like. Sensor data, namely, sensor information measured by the sensor unit 450 may be transferred to the processor 410.

The transmission/reception unit 440 may transmit/receive data to/from a surrounding device connected to the IoT, which includes the electronic device 400, under the control of the processor 410.

The processor 410 may be configured to control the overall operation of the electronic device 400, and may be configured to control the operations of the elements associated with data transmission. The application unit 411 of the processor 410 may correspond to the sensor application 210 of FIG. 2. The processor 410 may be configured to collect sensor data from the sensor unit 450 periodically or at a specific time point based on a function or service that an application provides through the application unit 411, and may create a data packet using the collected sensor data. Further, the processor 410 may be configured to set a maximum transmission delay value that corresponds to the data packet created through the application unit 411. The maximum transmission delay value may be a maximum time interval during which a transmission delay is possible based on the time point when the data packet is created, and may be determined based on the importance of the data packet and a function or service in which the data packet is used.

The application unit 411 may store the created data packet in the buffer 420 when the buffer 420 has sufficient space to store a data packet, and may store the created data packet in the database 430 when the buffer 420 is full of data packets. According to another example embodiment, the application unit 411 may transfer the created data packet to the buffer 420, and the buffer 420 may store the transferred data packet when there is sufficient available storage space therein and may store the corresponding data packet in the database 430 when there is not sufficient available storage space therein.

The buffer 420 may store the data packet transferred from the processor 410, and may correspond to the buffer 300 of FIG. 2. The buffer 420 may select a data packet based on a transmission sequence among the data packets stored therein in response to a request of the CSMA 413 included in the processor 410, and may transfer the selected data packet to the CSMA 413 of the processor 410, thereby allowing the selected data packet to be transmitted.

According to an example embodiment, when an available storage space is sufficient as the selected data packet is completely transmitted, the buffer 420 may retrieve the data packet stored in the database 430 and may store the same therein under the control of the transmission control unit 412

According to an example embodiment, when an available storage space in the buffer 420 is sufficient, the buffer 420 may transfer an aggregation level, which is determined by the transmission control unit 412, to the database 430, and the database 430 may store a data packet corresponding to the aggregation level in the buffer 420. The aggregation level determined by the transmission control unit 412 may also be transferred to the database 430 by the processor 410.

The wireless channel monitor 414 of the processor 410 may correspond to the wireless channel monitor 250 of FIG. 2. The wireless channel monitor 414 may monitor a received signal strength of a wireless channel through the transmission/reception unit 440 periodically or when the transmission control unit 412 makes a request, and may transmit the received signal strength to the transmission control unit 412.

The CSMA 413 of the processor 410 may correspond to the CSMA 290 of FIG. 2. The CSMA 413 may transmit the data packet, which is stored in the buffer 420, to a surrounding device through the transmission/reception unit 440 under the control of the transmission control unit 412. According to an example embodiment, the CSMA 413 may attempt to first transmit the data packet, which has been transferred from the buffer 420, to the surrounding device based on an instruction of the transmission control unit 412, and may attempt to transmit the next data packet when a transmission success response is received from the surrounding device. If a transmission failure response is received from the surrounding device, the CSMA 413 may delay the transmission based on a re-transmission delay value that has been set by the transmission control unit 412, and may attempt to re-transmit the corresponding data packet. The CSMA 413 may operate based on the re-transmission delay value, which has been set by the transmission control unit 412, every time the re-transmission is attempted, and may drop the corresponding data packet if the transmission fails for the maximum number of re-transmissions. The maximum number of re-transmissions may be determined by the application unit 411 or the transmission control unit 412, and may be determined based on a function or service in which the data packet is used.

The database 430 may store the data packet transferred from the processor 410, and may correspond to the database 310 of FIG. 2. The database processing unit 431 of the database may correspond to the database processing unit 330 of FIG. 2, and the data storage unit 432 of the database 430 may correspond to the data storage unit 340 of FIG. 2.

The database 430 may store the data packet transferred from the buffer 420 or the data packet transferred from the processor 410. The data storage unit 432 may store a data packet.

According to an example embodiment, when the buffer 420 makes a request, the database processing unit 431 may transfer, to the buffer 420, the data packets stored in the data storage unit 432 based on the transmission sequence of the data packets stored in the data storage unit 432.

According to an example embodiment, the database processing unit 431 may determine a data packet to transfer to the buffer 420 based on the aggregation level transferred by the buffer 420 and the transmission sequence of the data packets stored in the data storage unit 432. The aggregation level may represent the number of data packets that will be processed every time data is transmitted once. In cases where one data packet corresponds to the aggregation level, the data processing unit 431 may select the first data packet stored in the data storage unit 432 and may store the selected data packet in the buffer 420. In cases where a plurality of data packets correspond to the aggregation level, the data processing unit 431 may sequentially select the plurality of data packets and may determine representative information by using information that corresponds to each of the selected data packets. For example, the data processing unit 431 may determine the average of the plurality of pieces of information to be the representative information. In another example, the data processing unit 431 may determine one of the plurality of pieces of information to be representative information. For example, among the plurality of pieces of information, the largest value, the smallest value, or a randomly selected value may be determined to be representative information. The data processing unit 431 may configure a representative data packet that includes the representative information and may store the representative data packet in the buffer 420.

According to an example embodiment, the data processing unit 431 may also set the maximum transmission delay value and the current transmission delay value, which correspond to the representative data packet, by using the maximum transmission delay value and the current transmission delay value of the plurality of data packets that are used to create the representative data packet.

The transmission control unit 412 included in the processor 410 may correspond to the transmission control unit 240 of FIG. 2. The transmission control unit 412 may control the transmission of the data packet stored in the buffer 420 or the database 430.

According to an example embodiment, the transmission control unit 412 may transfer a data packet transmission request to the CSMA 413. The CSMA 413 may derive one of the data packets, which are stored in the buffer 420, based on the transmission sequence and may attempt the first transmission of the derived data packet to a surrounding device. When a transmission failure response is received from the surrounding device in response to the first transmission, the transmission control unit 412 may determine a re-transmission delay value of the corresponding data packet based on the maximum transmission delay value required by an application associated with the corresponding data packet, the current transmission delay value that has been counted up to the present based on the creation time of the data packet, and the currently received signal strength. The current transmission delay value may be counted by one of the application unit 411 and the transmission control unit 412. The received signal strength may be received from the wireless channel monitor 414.

The transmission control unit 412 may determine an additional transmission delay value using the current transmission delay value and the maximum transmission delay value when the current transmission delay value is smaller than or equal to the maximum transmission delay value. For example, the additional transmission delay value may be obtained by subtracting the current transmission delay value from the maximum transmission delay value. Further, when the currently received signal strength is lower than the minimum received signal strength, the transmission control unit 412 may determine the sum of a default transmission delay value and the additional transmission delay value to be a re-transmission delay value, and when the currently received signal strength exceeds the minimum received signal strength, the transmission control unit 412 may determine the default transmission delay value to be a re-transmission delay value.

The transmission control unit 412 may set the re-transmission delay value to the CSMA 413. The CSMA 413 may delay the transmission of the data packet based on the set re-transmission delay value and then, may attempt to re-transmit the corresponding data packet. The transmission control unit 412 may determine a re-transmission delay value every time re-transmission is attempted, and may set the determined re-transmission delay value to the CSMA 413. The CSMA 413 may drop the corresponding data packet when the transmission fails for the maximum number of re-transmissions.

According to an example embodiment, in cases where an available storage space in the buffer 420 is sufficient and data packets exist in the database 430 as at least one data packet stored in the buffer 420 is completely transmitted, the transmission control unit 412 may determine an aggregation level based on the result obtained by comparing the current transmission delay value of the oldest data packet stored in the database 430 with the maximum transmission delay value. Further, the transmission control unit 412 may set the aggregation level to the buffer 420.

For example, when the current transmission delay value of the oldest data packet stored in the database 430 exceeds half of the maximum transmission delay value, the transmission control unit 412 may increase an increment by 1, and when the increased increment exceeds a reference value, the transmission control unit 412 may increase the existing aggregation level by 1 level. If the current transmission delay value of the data packet is smaller than or equal to half of the maximum transmission delay value, the transmission control unit 240 may increase a decrement by 1, and when the increased decrement exceeds the reference value, the transmission control unit 412 may decrease the aggregation level by 1 level.

The buffer 420 may transfer the aggregation level, which has been set by the transmission control unit 412, to the database 430, and the database 430 may determine a data packet to transfer to the buffer 420 based on the transferred aggregation level and the transmission sequence of data packets stored in the data storage unit 432.

Operating processes of the electronic device 400, which is illustrated in FIG. 3, will be described with reference to FIGS. 4, 5, 6, 7, 8A and 8B.

Figure 4:
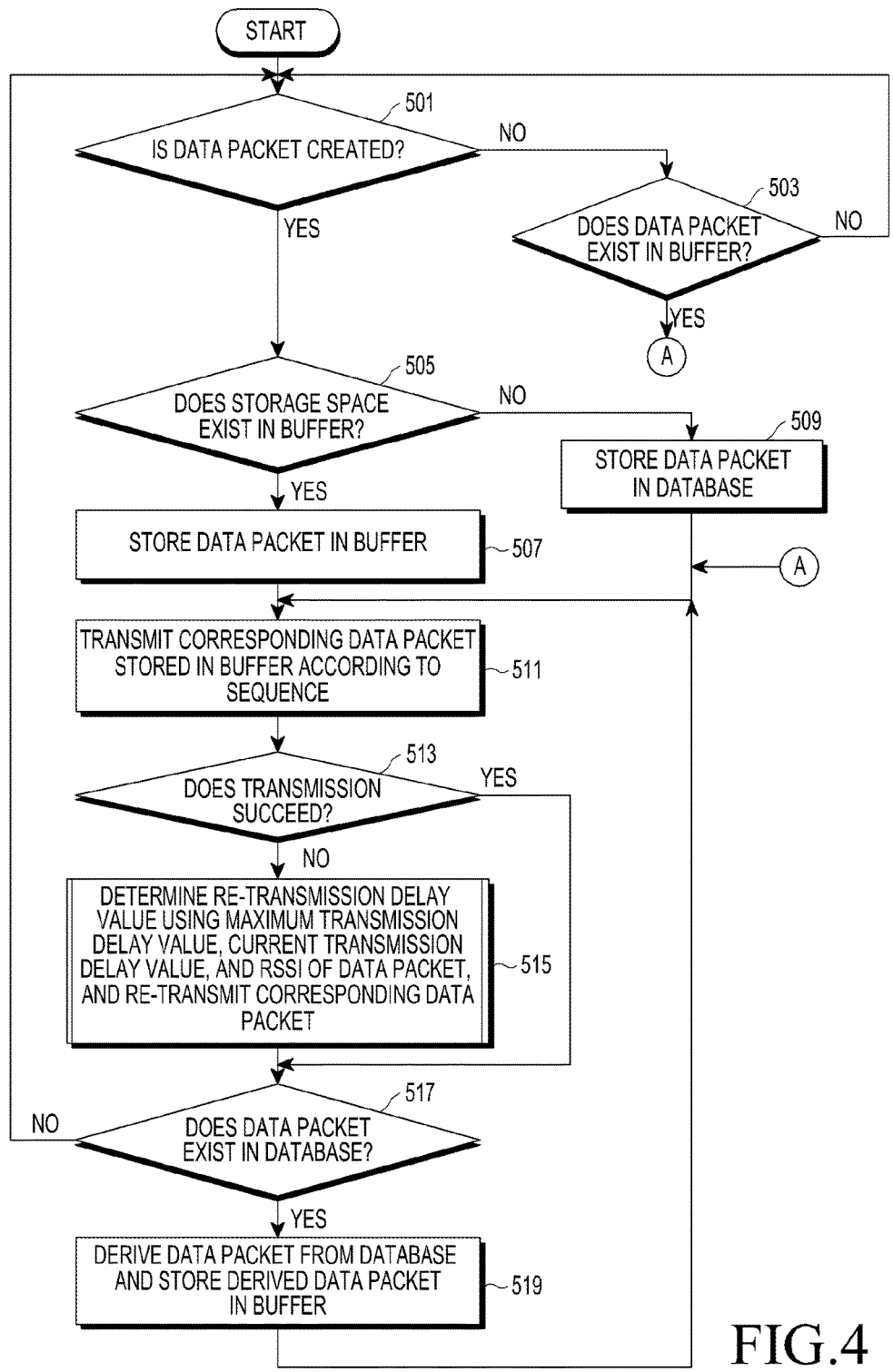
FIGS. 4, 5, 6, 7, 8A and 8B are flowcharts illustrating example operations of an example electronic device.

FIG. 4 is a flowchart illustrating an example process of transmitting data. In this example embodiment, it is possible to re-transmit a data packet by suitably setting a re-transmission delay value, thereby reducing transmission delay and loss of the data packet and reducing power consumption of the electronic device 400.

Referring to FIG. 4, when the processor 410 creates a data packet that includes information acquired by the sensor unit 450 from an external environment, namely, sensor data measured by the sensor unit 450 in step 501, the processor 410 may proceed to step 505 to identify whether the buffer 420 has sufficient storage space for storing the data packet. If it is determined in step 505 that the buffer 420 has sufficient storage space, the processor 410 may proceed to step 507 to store the data packet in the buffer, and may then proceed to step 511. If it is determined in step 505 that the buffer 420 has insufficient storage space, the processor may proceed to step 509 to store the data packet in the database 430, and may then proceed to step 511.

In step 511, when data packet transmission is required based on the periodic transmission of a data packet or a request of an application, the processor 410 may select a data packet to be transmitted based on a transmission sequence from the data packets stored in the buffer 420, and may attempt to transmit the selected data packet to a surrounding device.

If a transmission success response is received from the surrounding device in response to the data packet transmission in step 513, the processor 410 may proceed to step 517, and if a transmission failure response is received in step 513, the processor 410 may proceed to step 515.

In step 515, the processor 410 may determine a re-transmission delay value using the maximum transmission delay value, the current transmission delay value, and the currently received signal strength of the data packet in order to attempt to re-transmit the data packet, and may attempt to re-transmit the data packet based on the determined re-transmission delay value.

When the data packet is completely transmitted in step 515, the processor 410 may identify whether a data packet exists in the database 430 in step 517.

When a data packet exists in the database 430, the processor 410 may proceed to step 519 to derive the data packet from the database 430 and to store the derived data packet in the buffer 420, and may then proceed to step 511 to transmit the data packet stored in the buffer 420.

When no data packet exists in the database 430, the processor 410 may proceed to step 501. Further, when a new data packet is not created in step 501, the processor 410 may proceed to step 503 to identify whether a data packet remains in the buffer 420, and if so, the processor 410 may proceed to step 511 to transmit the data packet stored in the buffer 420.

Figure 5:
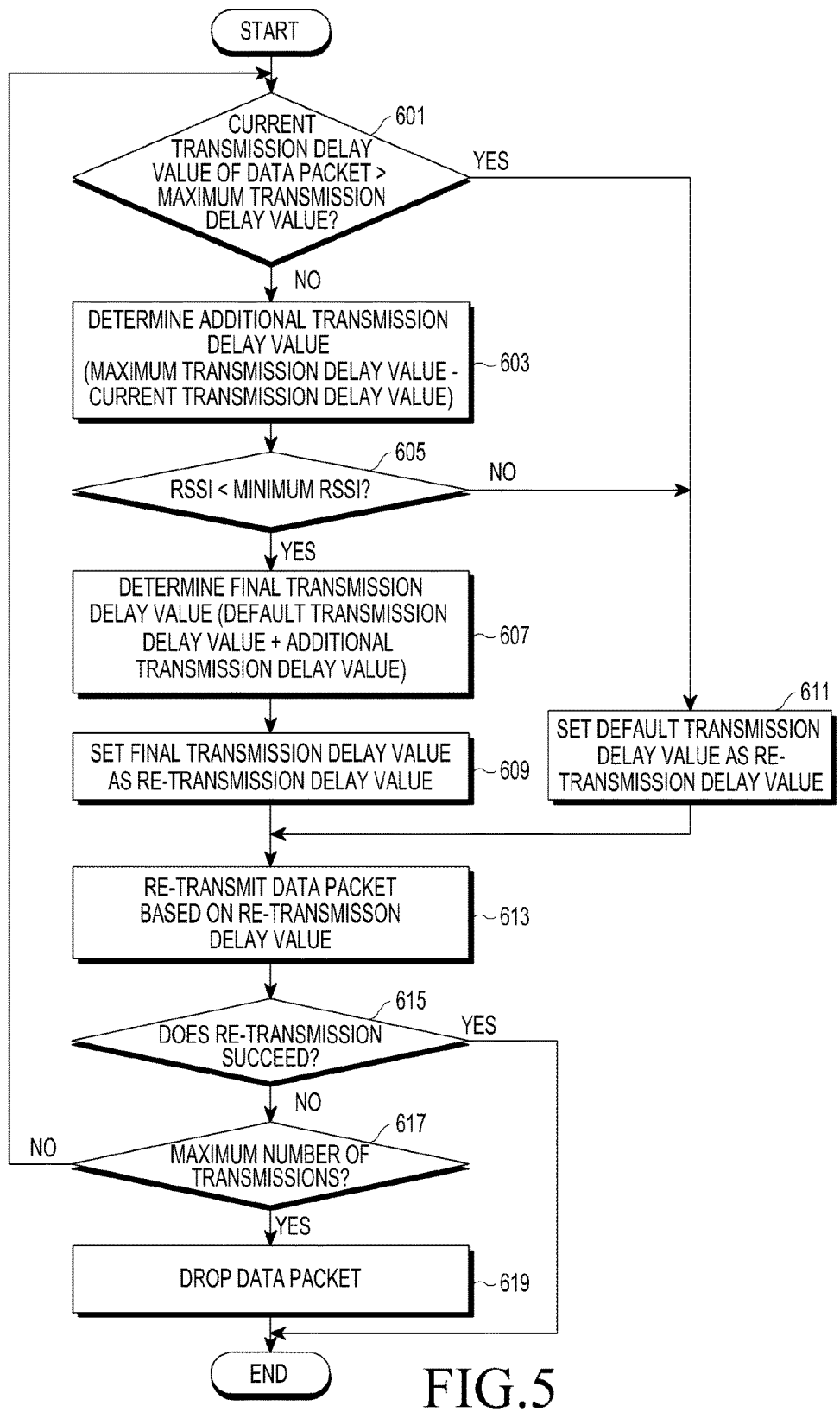

The re-transmission process in step 515 is illustrated in FIG. 5. FIG. 5 is a flowchart illustrating an example process of re-transmitting a data packet. Referring to FIG. 5, in step 601, the processor 410 may compare the current transmission delay value and the maximum transmission delay value of the corresponding data packet. When the comparison result shows that the current transmission delay value exceeds the maximum transmission delay value, the processor 410 may proceed to step 611 to determine a default transmission delay value to be a re-transmission delay value.

If it is determined in step 601 that the current transmission delay value is smaller than or equal to the maximum transmission delay value, the processor 410 may proceed to step 603 to determine an additional transmission delay value. For example, the additional transmission delay value may be obtained by subtracting the current transmission delay value from the maximum transmission delay value.

In step 605, the processor 410 may compare the currently measured received-signal strength and the minimum signal strength, and if the minimum signal strength is lower than the currently received signal strength, the processor 410 may proceed to step 607 to determine the final transmission delay value by adding the additional transmission delay value to the default transmission delay value. In step 609, the processor 410 may determine the final transmission delay value to be a re-transmission delay value.

In step 613, the processor 410 may delay the transmission based on the re-transmission delay value that has been determined in step 609 or 611, and may thereafter re-transmit the data packet.

When the currently received signal strength is lower than the minimum signal strength that is required when data is transmitted, the processor 410 may further delay the transmission of the data packet in consideration of the maximum transmission delay value of the data packet, and may then re-transmit the data packet. If a wireless environment is unstable, the transmission of a data packet may not be attempted, thereby reducing data loss and current consumption caused by data transmission.

If a transmission success response is received from a surrounding device in step 615 after the re-transmission of the data packet in step 613, the processor 410 may complete the transmission process for the corresponding data packet.

If a transmission failure response is received from the surrounding device, the processor 410 may identify whether the number of transmissions up to the present corresponds to the maximum number of transmissions, and when the number of transmissions up to the present is smaller than the maximum number of transmissions, the processor 410 may proceed to step 601 to attempt re-transmission. If the number of transmissions up to the present is equal to the maximum number of transmissions, the processor 410 may proceed to step 619 to drop the corresponding data packet and to complete the transmission process for the corresponding data packet.

Figure 6:
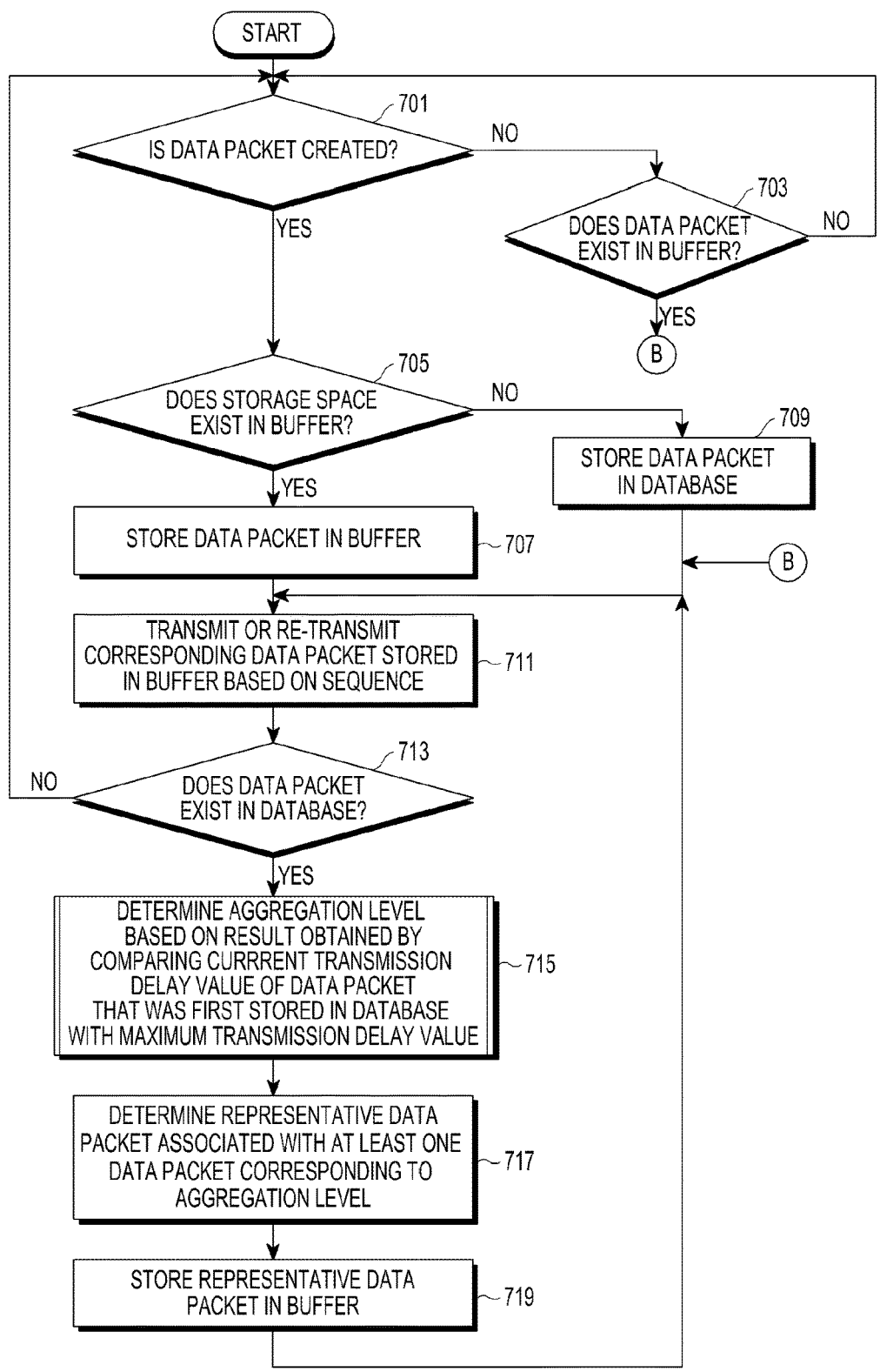

FIG. 6 is a flowchart illustrating an example process of transmitting data. In this example embodiment, a data packet stored in a database is properly set and transmitted based on an aggregation level to thereby reduce transmission delay and loss of the data packet and reduce power consumption of the electronic device 400.

Referring to FIG. 6, when the processor 410 creates a data packet that includes information acquired by the sensor unit 450 from an external environment, namely, sensor data measured by the sensor unit 450 in step 701, the processor 410 may proceed to step 705 to determine whether the buffer 420 has sufficient storage space for storing the data packet. If it is determined in step 705 that the buffer 420 has sufficient storage space, the processor 410 may proceed to step 707 to store the data packet in the buffer, and may then proceed to step 711. If it is determined in step 705 that the buffer 420 has insufficient storage space, the processor may proceed to step 709 to store the data packet in the database 430, and may then proceed to step 711.

In step 711, when data packet transmission is required based on the periodic transmission of a data packet or a request of an application, the processor 410 may select a data packet to be transmitted based on a transmission sequence from the data packets stored in the buffer 420, and may attempt transmission or re-transmission of the selected data packet to a surrounding device.

When the data packet is completely transmitted in step 711, the processor 410 may identify whether a data packet exists in the database 430 in step 713. The completion of the transmission of the data packet may refer to a state in which the corresponding data packet has been successfully transmitted to the surrounding device, or a state in which the transmission has finally failed so that the corresponding data packet has been dropped, and the transmission of the corresponding data packet is no longer attempted. If it is identified in step 713 that a data packet exists in the database 430, the processor 410 may determine an aggregation level based on the result obtained by comparing the current transmission delay value of the first data packet stored in the database 430 with the maximum transmission delay value in step 715. The aggregation level may represent the number of data packets that will be processed when data is transmitted once.

Figure 7:
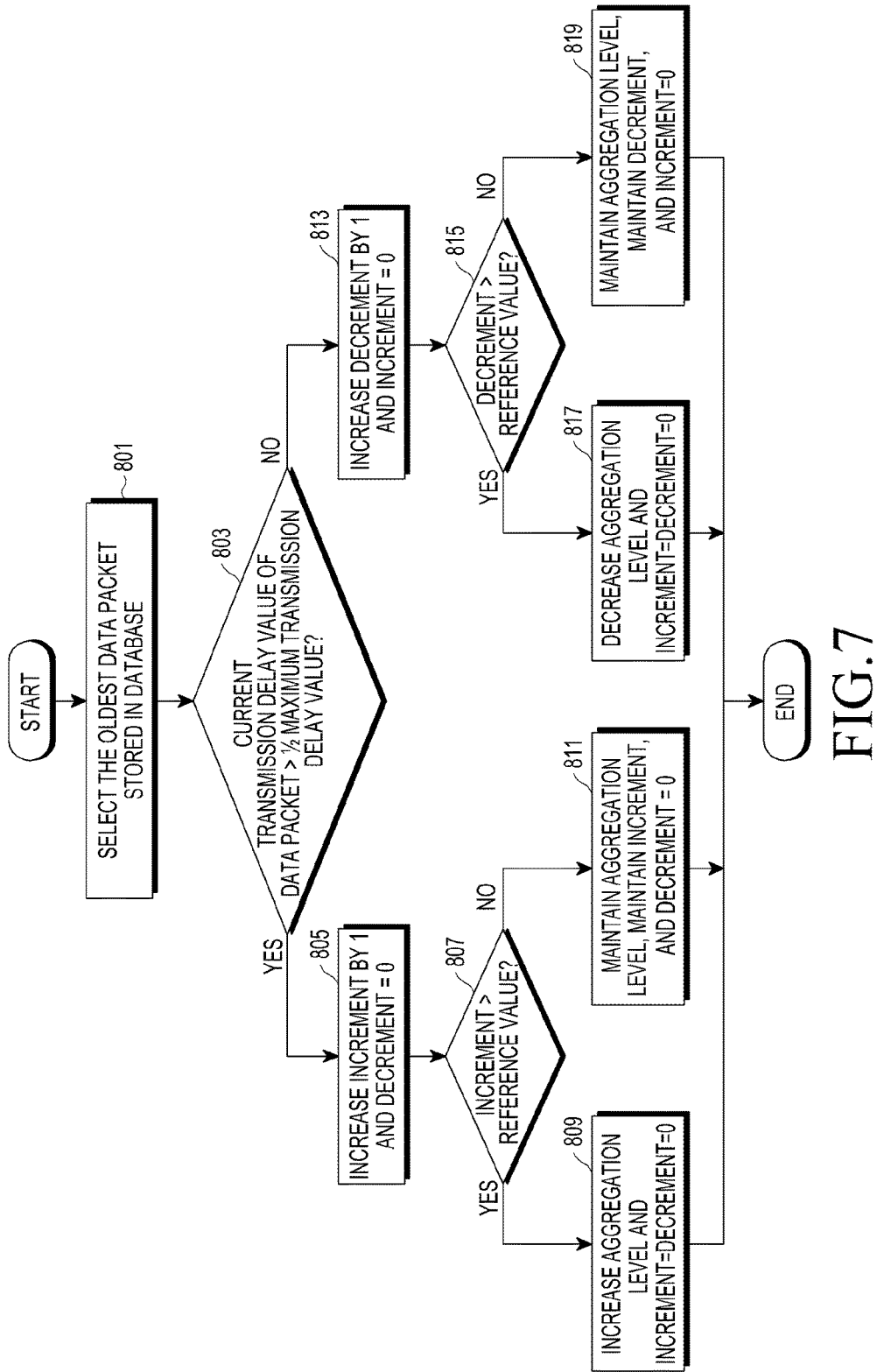

The process of determining the aggregation level in step 715 is illustrated in FIG. 7. Referring to FIG. 7, in step 801, the processor 410 may select the oldest data packet stored in the database 430, namely, the first transmitted data packet. In step 803, the processor 410 may compare the current transmission delay value of the data packet with half of the maximum transmission delay value of the data packet, and if the current transmission delay value exceeds half of the maximum transmission delay value of the data packet, the processor 410 may proceed to step 805. In step 805, the processor 410 may increase an increment by 1 and may set a decrement to 0. In step 807, the processor 410 may compare the increased increment and a reference value, and if the comparison result shows that the increment exceeds the reference value, the processor 410 may increase the aggregation level by 1 in step 809. In this case, the increment and the decrement may be reset to 0. If the comparison result in step 807 shows that the increment is smaller than or equal to the reference value, the processor 410 may maintain the existing aggregation level in step 811. In this case, the increment may be maintained, and the decrement may be reset to 0.

If the comparison result in step 803 shows that the current transmission delay value of the data packet is smaller than or equal to half of the maximum transmission delay value of the data packet, the processor 410 may increase the decrement by 1 and may set the increment to 0 in step 813. In step 815, the processor 410 may compare the increased decrement and the reference value, and if the comparison result shows that the decrement exceeds the reference value, the processor 410 may, in step 817, decrease the aggregation level by 1 in cases where the aggregation level does not correspond to the minimum value. If the aggregation level corresponds to the minimum value, the aggregation level is maintained at the minimum value, and the increment and decrement may be reset to 0. If the comparison result in step 815 shows that the decrement is smaller than or equal to the reference value, the existing aggregation level may be maintained in step 819. In this case, the decrement may be maintained, and the increment may be reset to 0.

As in the process of FIG. 7, every time a data packet in the database 430 is stored in the buffer 420, the current transmission delay value of the corresponding data packet is compared with the maximum transmission delay value, and if it is determined that the current transmission delay value closely approaches the maximum transmission delay value in succession, the aggregation level may be gradually increased. Further, if the result of the comparison of the current transmission delay value of the corresponding data packet and the maximum transmission delay value shows that the current transmission delay value does not closely approach the maximum transmission delay value in succession, the aggregation level may be gradually decreased.

Returning to FIG. 6, the processor 410 may transfer the aggregation level, which has been determined in step 715, namely, in the process of FIG. 7, to the database 430 to determine a data packet to transfer to the buffer 420 and store the determined data packet in the buffer 420 based on the aggregation level and the transmission sequence of the data packets stored in the database 430 in steps 717 and 719. In cases where one data packet corresponds to the aggregation level, the data processing unit 431 may determine a data packet with the highest transmission priority among the data packets stored in the data storage unit 432 to be a representative data packet, and may store the representative data packet in the buffer 420. In cases where a plurality of data packets correspond to the aggregation level, the data processing unit 431 may sequentially select the plurality of data packets, and may determine representative information using information that corresponds to each of the selected data packets. For example, the data processing unit 431 may determine the average of the plurality of pieces of information to be representative information. In another example, the data processing unit 431 may determine one of the plurality of pieces of information to representative information. For example, among the plurality of pieces of information, the largest value, the smallest value, or a randomly selected value may be determined to be representative information. The data processing unit 431 may configure a representative data packet that includes the representative information. Further, the representative data packet may be stored in the buffer 420.

The processor 410 may proceed to step 711 to allow the data packet stored in the buffer 420 to be transmitted.

If it is determined in step 713 that no data packet exists in the database 430, the processor 410 may proceed to step 701. Further, if a new data packet is not created in step 701, the processor 410 may proceed to step 703 to determine whether there is a data packet stored in the buffer 420, and if so, the processor 410 may proceed to step 711 to allow the data packet stored in the buffer 420 to be transmitted.

As described above, when the result obtained by comparing the current transmission delay value of the corresponding data packet and the maximum transmission delay value shows that the current transmission delay value closely approaches the maximum transmission delay value in succession, the processor may gradually increase the aggregation level to transmit a plurality of data packets at one time, and when the comparison result shows that the current transmission delay value does not closely approach the maximum transmission delay value in succession, the processor may gradually decrease the aggregation level to transmit one data packet at a time, thereby reducing transmission delay and loss of the data packet and reducing power consumption of the electronic device 400.

Figure 8A:
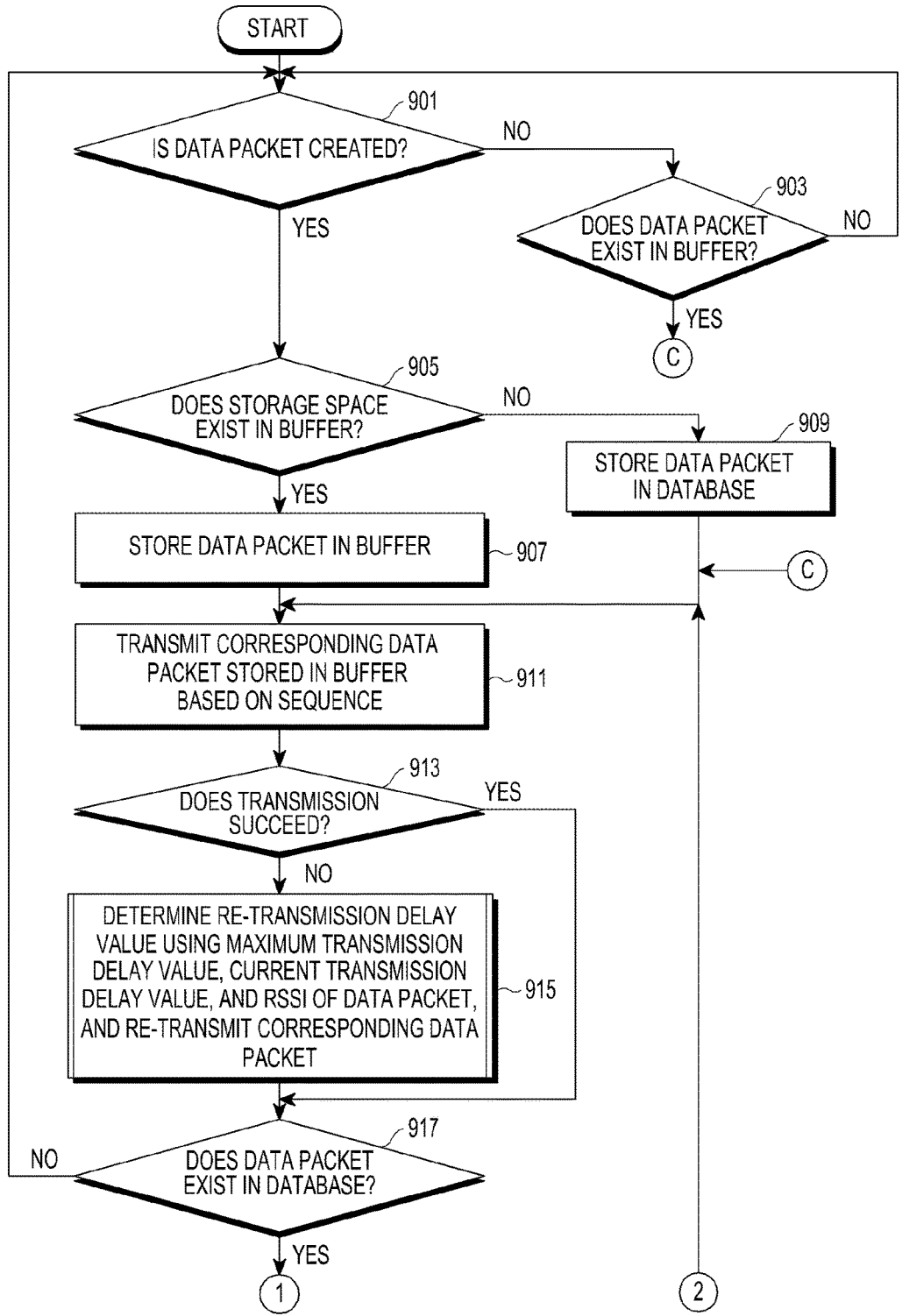
Figure 8B:
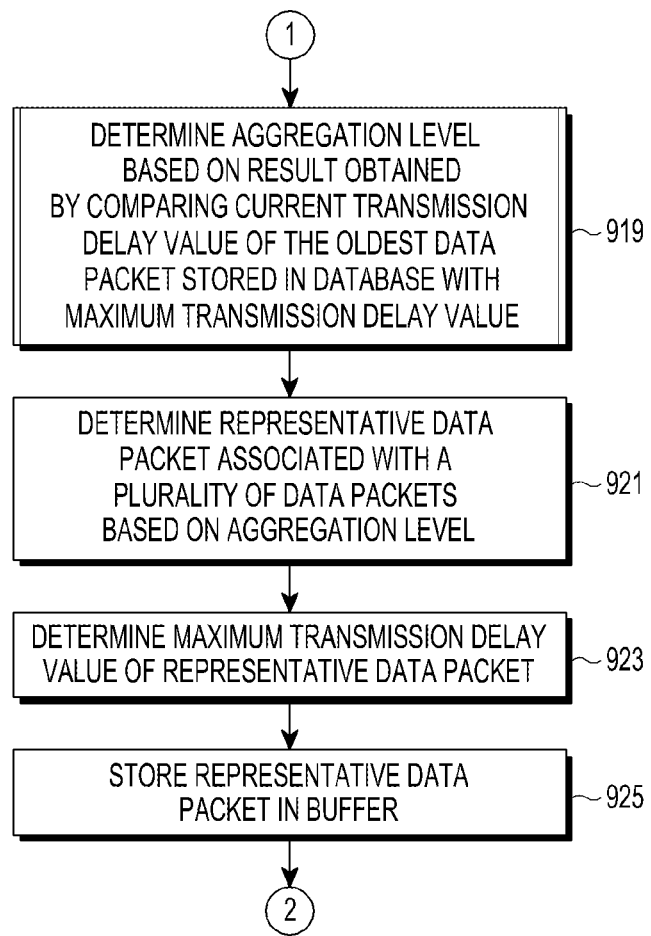

FIGS. 8A and 8B are flowcharts illustrating an example process of transmitting data. In this example embodiment, it is possible to suitably set a re-transmission delay value and to re-transmit a data packet using an aggregation level, thereby reducing transmission delay and loss of the data packet and reducing power consumption of the electronic device 400.

Referring to FIG. 8A, when the processor 410 creates a data packet that includes information acquired by the sensor unit 450 from an external environment, for example, sensor data measured by the sensor unit 450 in step 901, the processor 410 may proceed to step 905 to determine whether the buffer 420 has sufficient storage space for storing the data packet. If it is determined in step 905 that the buffer 420 has sufficient storage space, the processor 410 may proceed to step 907 to store the data packet in the buffer, and may then proceed to step 911. If it is determined in step 905 that the buffer 420 has insufficient storage space, the processor may proceed to step 909 to store the data packet in the database 430, and may then proceed to step 911.

In step 911, when data packet transmission is required based on the periodic transmission of a data packet or a request of an application, the processor 410 may select a data packet to be transmitted based on a transmission sequence from the data packets stored in the buffer 420, and may attempt to transmit the selected data packet to a surrounding device.

If a transmission success response is received from the surrounding device in response to the data packet transmission in step 913, the processor 410 may proceed to step 917, and if a transmission failure response is received in step 913, the processor 410 may proceed to step 915.

In step 915, the processor 410 may determine a re-transmission delay value using the maximum transmission delay value, the current transmission delay value, and the currently received signal strength of the data packet in order to attempt to re-transmit the data packet, and may attempt to re-transmit the data packet based on the determined re-transmission delay value. The re-transmission process in step 915 may be similar to that illustrated in FIG. 5.

If the data packet is completely transmitted in step 915, the processor 410 may determine whether a data packet exists in the database 430 in step 917. The completion of the transmission of the data packet may refer to a state in which the corresponding data packet has been successfully transmitted to the surrounding device, or a state in which the transmission has finally failed so that the corresponding data packet has been dropped, and the transmission of the corresponding data packet is not attempted any more.

In step 917, the processor 410 may determine whether a data packet exists in the database 430. If it is determined in step 917 that a data packet exists in the database 430, the processor 410 may determine an aggregation level based on the result obtained by comparing the current transmission delay value of the first data packet stored in the database 430 with the maximum transmission delay value in step 919 of FIG. 8B. The process of determining the aggregation level in step 919 may be similar to that of FIG. 7.

The processor 410 may transfer the aggregation level, which has been determined in step 919, to the database 430 to determine a data packet to transfer to the buffer 420 and the maximum transmission delay value of the determined data packet and to store the determined data packet in the buffer 420 according to the aggregation level and the transmission sequence of the data packets stored in the database 430 in steps 921 to 925.

In cases where one data packet corresponds to the aggregation level, the data processing unit 431 may determine a data packet with the highest transmission priority among the data packets stored in the data storage unit 432 to be a representative data packet, and may store the representative data packet in the buffer 420. The maximum transmission delay value of the representative data packet may be equal to that of the data packet that has the highest transmission priority.

In cases where a plurality of data packets correspond to the aggregation level, the data processing unit 431 may sequentially select the plurality of data packets, and may determine representative information using information included in each of the selected data packets. For example, the data processing unit 431 may determine the average of the plurality of pieces of information to be representative information. In another example, the data processing unit 431 may determine one of the plurality of pieces of information to representative information. For example, among the plurality of pieces of information, the largest value, the smallest value, or a randomly selected value may be determined to be representative information. The data processing unit 431 may configure a representative data packet that includes the representative information, and the representative data packet may be stored in the buffer 420.

The maximum transmission delay value of the representative data packet may be determined using the maximum transmission delay value that corresponds to each of the data packets that have been selected to correspond to the aggregation level. For example, the average of the maximum transmission delay values of the plurality of data packets may be the maximum transmission delay value of the representative data packet. In another example, one of the maximum transmission delay values of the plurality of data packets may be determined to be the maximum transmission delay value of the representative data packet. For example, among the plurality of maximum transmission delay values, the largest value, the smallest value, or a randomly selected value may be determined to be the maximum transmission delay value of the representative data packet.

The processor 410 may proceed to step 911 to allow the data packet stored in the buffer 420 to be transmitted.

If the determination result in step 917 shows that no data packet exists in the database 430, the processor 410 may proceed to step 901. When a new data packet is not created in step 901, the processor 410 may proceed to step 903 to identify whether a data packet remains in the buffer 420, and if so, the processor 410 may proceed to step 911 to allow the data packet stored in the buffer 420 to be transmitted.

Transmitting data as described above makes it possible to reduce transmission delay and loss of a data packet and to reduce power consumption of the electronic device 400.

As described above, a transmission delay value can be determined based on the currently received signal strength when a data packet is re-transmitted so that it is possible to prevent and/or reduce the occurrence of the data packet from being unnecessarily re-transmitted in a state in which a wireless environment is unstable, thereby reducing current consumption. Furthermore, a separate database can be provided to address limitations of a transmission delay and a deficiency in a buffer storage space. In cases where a transmission delay of a data packet exceeds the maximum transmission delay, a plurality of data packets stored in a database can be transmitted at one time, thereby adjusting a transmission cycle and reducing power consumption. In addition, a transmission delay of a data packet can be adjusted based on a transmission delay required by an application.

Although example embodiments are described in the above description of the disclosure, various modifications can be made without departing from the scope of the disclosure. Accordingly, the scope of the disclosure shall not be determined by the above-described example embodiments, and is to be determined by the following claims and their equivalents.

What is claimed is:

1. A method of transmitting data in an electronic device, comprising:
transmitting a data packet selected from a buffer based on a transmission sequence, the data packet being associated with an application;
in response to failure of the transmission of the data packet, determining a re-transmission delay value based on a maximum transmission delay value required by the application associated with the data packet, a current transmission delay value of the data packet, and a currently measured received signal strength of a wireless channel;
re-transmitting the data packet after delaying the transmission by the re-transmission delay value; and
wherein the determining of the re-transmission delay value comprises: determining an additional transmission delay value based on a difference between the current transmission delay value and the maximum transmission delay value when the current transmission delay value is less than or equal to the maximum transmission delay value, and determining the re-transmission delay value based on a sum of the additional transmission delay value and a default transmission delay value when the measured received signal strength of the wireless channel is less than a minimum received signal strength.

2. The method of claim 1, wherein the default transmission delay value is determined to be the re-transmission delay value when the current transmission delay value is greater than the maximum transmission delay value, or when the measured received-signal strength of the wireless channel is greater than the minimum received signal strength.

3. The method of claim 2, further comprising:
creating a data packet that includes information created by the electronic device; and
storing the created data packet in a buffer when there is sufficient storage space available in the buffer, and storing the created data packet in a database when there is insufficient available storage space in the buffer.

4. The method of claim 3, further comprising:
when a storage space of the buffer is sufficient, determining a representative data packet by selecting data packets corresponding to an aggregation level from the database, and storing the representative data packet in the buffer.

5. The method of claim 4, wherein, when the plurality of data packets are corresponding to the aggregation level, the representative data packet includes at least one of the average value, the maximum value, the minimum value, and a randomly selected value of a plurality of pieces of information corresponding to the respective data packets.

6. The method of claim 4, wherein the aggregation level is determined based on a result obtained by comparing the current transmission delay value and the maximum transmission delay value of a specific data packet with a highest transmission priority in the database.

7. The method of claim 6, wherein an increment value is increased when the current transmission delay value of the specific data packet is greater than half of the maximum transmission delay value of the specific data packet, and the aggregation level is increased when the increased increment value is greater than a reference value; and a decrement value is increased when the current transmission delay value of the specific data packet is less than or equal to half of the maximum transmission delay value of the specific data packet, and the aggregation level is decreased when the increased decrement value is greater than the reference value.

8. A method of transmitting data in an electronic device, comprising:
creating a data packet including information created by the electronic device;
storing the created data packet in a database when there is insufficient storage space in a buffer;
when a storage space of the buffer is sufficient, determining a representative data packet by selecting data packets corresponding to an aggregation level from the database, and storing the representative data packet in the buffer;
sequentially transmitting data packets stored in the buffer to another electronic device; and
wherein an increment value is increased when a current transmission delay value of a specific data packet is greater than half of a maximum transmission delay value of the specific data packet, and the aggregation level is increased when the increased increment value is greater than a reference value; and a decrement value is increased when the current transmission delay value of the specific data packet is less than or equal to half of the maximum transmission delay value of the specific data packet, and the aggregation level is decreased when the increased decrement value is greater than the reference value.

9. An electronic device comprising:
transmission/reception circuitry configured to transmit and receive data;
a buffer configured to store data packets;
a processor configured to: transmit a data packet selected from the buffer through the transmission/reception circuitry based on a transmission sequence, the data packet associated with an application; in response to failure of the transmission of the data packet, to determine a re-transmission delay value using a maximum transmission delay value required by the application associated with the data packet, a current transmission delay value of the data packet, and a currently measured received-signal strength of a wireless channel; and to re-transmit the data packet through the transmission/reception circuitry after delaying the data transmission by the re-transmission delay value; and
wherein the processor is configured to determine an additional transmission delay value based on a difference between the current transmission delay value and the maximum transmission delay value when the current transmission delay value is less than or equal to the maximum transmission delay value, and to determine the re-transmission delay value based on a sum of an additional transmission delay value and a default transmission delay value when the measured received signal strength is less than a minimum received signal strength.

10. The electronic device of claim 9, wherein the default transmission delay value is determined to be the re-transmission delay value when the current transmission delay value is greater than the maximum transmission delay value, or when the measured received signal strength is greater than the minimum received signal strength.

11. The electronic device of claim 10, wherein the processor is configured to: create a data packet that includes information created by the electronic device; and store the created data packet in the buffer when there is sufficient storage space in the buffer and stores the created data packet in a database when there is insufficient storage space in the buffer.

12. The electronic device of claim 11, wherein when a storage space of the buffer is sufficient, the processor is configured to determine a representative data packet by selecting as many data packets as the number corresponding to an aggregation level from the database, and to store the representative data packet in the buffer.

13. The electronic device of claim 12, wherein, when the plurality of data packets are selected corresponding to the aggregation level, the representative data packet includes at least one of the average value, the maximum value, the minimum value, and a randomly selected value of a plurality of pieces of information corresponding to the respective data packets.

14. The electronic device of claim 12, wherein the aggregation level is determined based on a result obtained by comparing the current transmission delay value and the maximum transmission delay value of a specific data packet with a highest transmission priority in the database.

15. The electronic device of claim 14, wherein an increment value is increased when the current transmission delay value of the specific data packet is larger than half of the maximum transmission delay value of the specific data packet, and the aggregation level is increased when the increased increment value is greater than a reference value; and
  a decrement value is increased when the current transmission delay value of the specific data packet is less than or equal to half of the maximum transmission delay value of the specific data packet, and the aggregation level is decreased when the increased decrement value is greater than the reference value.

16. An electronic device comprising:
transmission/reception circuitry configured to transmit and receive data;
a buffer configured to store data packets;
a database that is configured to: store data packets when there is insufficient storage space in the buffer; and determine a representative data packet by selecting data packets corresponding to an aggregation level, from the database, and store the representative data packet in the buffer when a storage space of the buffer is sufficient;
a processor configured to: determine the aggregation level and to sequentially transmit the data packets stored in the buffer to another electronic device through the transmission/reception circuitry, wherein an increment value is increased when a current transmission delay value of a specific data packet is greater than half of a maximum transmission delay value of the specific data packet, and the aggregation level is increased when the increased increment value is greater than a reference value; and a decrement value is increased when the current transmission delay value of the specific data packet is less than or equal to half of the maximum transmission delay value of the specific data packet, and the aggregation level is decreased when the increased decrement value is greater than the reference value.

* * * * *